United States Patent [19]

Shaw et al.

[11] Patent Number: 4,936,794
[45] Date of Patent: Jun. 26, 1990

[54] RECESSED A C WALL OUTLET

[76] Inventors: Robert L. Shaw, 5465 Capistrano, Atascadero, Calif. 93422; George Spector, 233 Broadway, #3815, New York, N.Y. 10007

[21] Appl. No.: 364,898
[22] Filed: Jun. 12, 1989
[51] Int. Cl.⁵ ............................................. H01R 13/60
[52] U.S. Cl. ...................................... 439/538; 220/3.4
[58] Field of Search ........................... 439/535, 538; 220/3.2–3.5

[56] References Cited
U.S. PATENT DOCUMENTS 948,438  2/1910  Ziegler et al. .................. 220/3.4 X
1,302,057 4/1919  Knight ............................. 220/3.4
2,934,590 4/1960  Thompson et al. ............ 439/535 X
4,059,327 11/1977 Vann ................................ 439/538 X Primary Examiner—Eugene F. Desmond

[57] ABSTRACT

A recessed electrical outlet is provided mounted in a wall and includes an outlet box that has an outer mounting surface for receiving an electric receptacle aligned with the surface in combination with a recessed cover plate to protect an electric plug which will not protrude past the wall. The outlet box can be secured to side of a wall stud by a fastener driven from open side of the outlet box through an angular mounting hole in a reinforced boss.

2 Claims, 1 Drawing Sheet

RECESSED A C WALL OUTLET

BACKGROUND OF THE INVENTION

The instant invention relates generally to electrical wiring devices and more specifically it relates to a recessed electrical outlet.

Numerous electrical wiring devices have been provided in prior art that are adapted to employ receptacles and are built in the walls of building structures. For example, U.S. Pat. Nos. 2,244,937 and 3,917,899 are illustrative of such prior art. While these units may be suitble for the particular purpose to which they address, they would not be as suitable for the purposes of the present invention as heretofore described.

SUMMARY OF THE INVENTION

A primary object of the present invention is to provide a recessed electrical outlet that will overcome the shortcomings of the prior art devices.

Another object is to provide a recessed electrical outlet mounted in a wall in which an outlet box has an outer mounting surface for receiving an electric receptacle aligned with the surface in combination with a recessed cover plate so as to protect an electric plug which will not protrude past the wall.

An additional object is to provide a recessed electrical outlet in which the outlet box can be secured to side of a wall stud by a fastener driven from open side of outlet box through an angular mounting hole in a reinforced boss.

A further object is to provide a recessed electrical outlet that is simple and easy to use.

A still further object is to provide a recessed electrical outlet that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
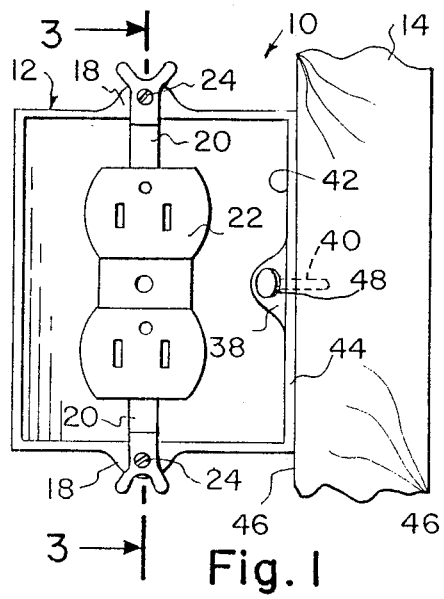
FIG. 1 is a front view of the outlet box and receptacle of the invention mounted to a wall stud.
Figure 3:
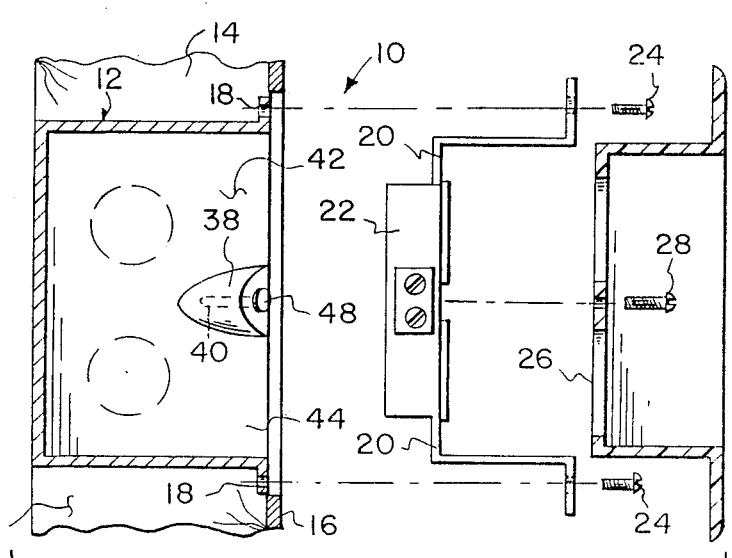
FIG. 3 is an exploded cross sectional view taken along line 3—3 in FIG. 1 and FIG. 2, showing how the corresponding elements of the invention are interconnected together.
Figure 2:
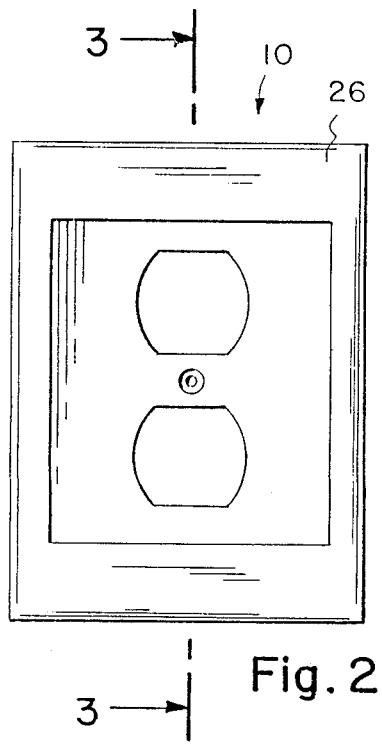
FIG. 2 is a front view of the cover plate of the invention.

Turning now descriptively to the drawings, in which similar reference characters denote similar elements throughout the several views, FIGS. 1, 2 and 3 illustrate elements of a first embodiment of a recessed electrical outlet 10. An outlet box 12 is mounted to side of a wall stud 14 behind a wall 16. The outlet box 12 is provided with mounting tabs 18 at the open side thereof for receiving and supporting elongated and bent mounting straps 20 of an electric receptacle 22 for the purpose of recessing the receptacle within the outlet box 12 and are secured by screws 24 to the tabs 18. A recessed cover plate 26 is then secured to the electric receptacle 22 by a mounting screw 28. An electric plug (not shown) can be inserted into the electric receptacle 22 and will not protrude past the wall 16 and therefore will not be in a position to be damaged by furniture or the like being pushed against or across the wall 16.

Figure 4:
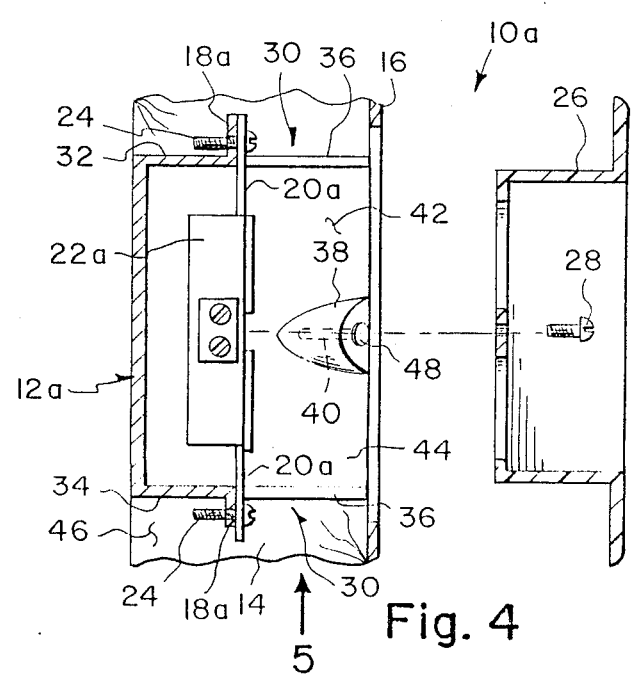
FIG. 4 is a cross sectional view of a modification showing slots in the outlet box so that a standard receptacle can be mounted thereto.
Figure 5:
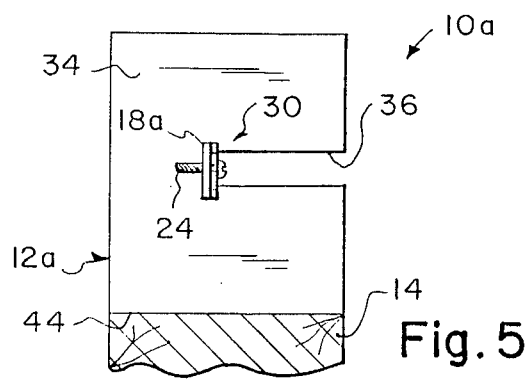
FIG. 5 is a bottom view of the modification as indicated by arrow 5 in FIG. 4.

FIGS. 4 and 5 illustrate elements of a second embodiment of a recessed electrical outlet 10a. The outlet box 12a has a structure 30 for receiving ends of opposite straight mounting straps 20a of a standard electric receptacle 22a for alignment and securing purposes. The structure 30 includes upper and lower walls 32 and 34 of the outlet box 12a each having a slot 36 extending about half way in from open side thereof with a right angled outwardly extending mounting tab 18a formed at inward end of the slot 36.

As best seen in FIGS. 1, 3 and 5, a reinforced boss 38 can be provided having an angularly positioned mounting hole 40 therethrough. The boss 38 is formed on inner surface 42 of one side 44 of the outlet box 12, 12a so that the outlet box can be secured to side 46 of the wall stud 14 when a fastener 48, such as a nail or screw, is driven from the open side of the outlet box 12, 12a through the mounting hole 40 in the reinforced boss 38 and into the wall stud 14.

Dimensions of the outlet box 12, 12a, receptacle 22, 22a and cover plate 26 can vary to accommodate all size wall studs 14 and wall structures 16 in general.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A recessed electrical outlet adapted to be mounted in a wall comprising an outlet box having a transverse outer mounting surface with recessed means for receiving an electric receptacle therein said receptacle having a portion aligned with said surface in combination with a recessed cover plate mounted on said receptacle and adapted to be mounted in said wall wherein said outlet box has means for receiving ends of opposite mounting straps of said electric receptacle for alignment and securing purposes wherein said receiving means includes upper and lower walls of said outlet box each having a slot extending about half away in from the open side thereof with a right angled outwardly extending mounting tab formed at the inward end of said slot.

2. A recessed electrical outlet as recited in claim 1, further comprising a reinforced boss having an angularly positioned mounting hole therethrough, said boss formed on the inner surface of one side of said outlet box so that said outlet box can be secured to a side of a wall stud when a fastener is driven from the open side of the outlet box through said mounting hole in said reinforced boss and into the wall stud.

* * * * *